United States Patent
Nakao et al.

(10) Patent No.: US 11,535,759 B2
(45) Date of Patent: *Dec. 27, 2022

(54) WATERBORNE COMPOSITIONS CONTAINING INORGANIC ION-EXCHANGERS TO IMPROVE CORROSION RESISTANCE

(71) Applicant: Covestro LLC, Pittsburgh, PA (US)

(72) Inventors: Makoto Nakao, Pittsburgh, PA (US); Philip Jones, Gibsonia, PA (US); Carol Knox, Apollo, PA (US); Ilya Ilyin, Wayland, MA (US); Boris Tkachev, St. Petersburg (RU)

(73) Assignee: Covestro LLC, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/141,378

(22) Filed: Jan. 5, 2021

(65) Prior Publication Data

US 2021/0122927 A1 Apr. 29, 2021

Related U.S. Application Data

(62) Division of application No. 16/015,978, filed on Jun. 22, 2018, now abandoned.

(51) Int. Cl.
*C09D 5/08* (2006.01)
*C09D 7/61* (2018.01)
(Continued)

(52) U.S. Cl.
CPC ............ *C09D 5/08* (2013.01); *C09D 7/61* (2018.01); *C09D 175/04* (2013.01)

(58) Field of Classification Search
None
See application file for complete search history.

(56) References Cited

U.S. PATENT DOCUMENTS

| | | |
|---|---|---|
| 2,582,985 A | 1/1952 | Greenlee |
| 2,615,007 A | 10/1952 | Greenlee |

(Continued)

FOREIGN PATENT DOCUMENTS

| | | |
|---|---|---|
| CN | 105505164 A | 4/2016 |
| CN | 108034348 A | 5/2018 |

(Continued)

OTHER PUBLICATIONS

IXE(R)-600 product information sheet from Toagosei Co. Ltd. (Year: 2020).*

*Primary Examiner* — Ramsey Zacharia

(74) *Attorney, Agent, or Firm* — Richard P. Bender; John E. Mrozinski, Jr.

(57) ABSTRACT

The present invention provides an anti-corrosion composition comprising an inorganic ion-exchanger and a waterborne resin, wherein a substrate exposed to a halide-containing environment and having the anti-corrosion composition applied thereto has a reduced level of corrosion compared to the substrate exposed to the halide-containing environment without the anti-corrosion composition being applied. The inventive waterborne anti-corrosion composition may find use on substrates such as automotive vehicles, bridges, cranes, superstructures, offshore oil & gas rigs, pipes, tanks, ships, barges, boats, aircraft, concrete, and masonry that are exposed to halide-containing environments.

23 Claims, 4 Drawing Sheets

Soluble salt (NaCl) on steel surface

Salt concentration to prepare salt contaminated steel

(51) Int. Cl.
*C09D 175/04* (2006.01)
*C08G 18/08* (2006.01)
*C08G 18/38* (2006.01)
*C08G 18/62* (2006.01)
*C08G 18/79* (2006.01)
*C08K 3/34* (2006.01)

(56) References Cited

U.S. PATENT DOCUMENTS

| | | |
|---|---|---|
| 2,633,458 A | 3/1953 | Shokal |
| 3,018,262 A | 1/1962 | Schroeder |
| 4,048,179 A | 9/1977 | Shen et al. |
| 4,073,762 A | 2/1978 | Hosoda et al. |
| 5,034,435 A | 7/1991 | Squiller et al. |
| 5,126,170 A | 6/1992 | Zwiener et al. |
| 5,236,741 A | 8/1993 | Zwiener et al. |
| 5,243,012 A | 9/1993 | Wicks et al. |
| 5,405,688 A | 4/1995 | Decker et al. |
| 5,489,704 A | 2/1996 | Squiller et al. |
| 5,717,091 A | 2/1998 | Richter et al. |
| 5,736,604 A | 4/1998 | Luthra |
| 6,153,719 A | 11/2000 | Abbey et al. |
| 6,242,083 B1 | 6/2001 | McGrail et al. |
| 6,458,293 B1 | 10/2002 | Roesler et al. |
| 6,572,971 B2 | 6/2003 | Martin |
| 6,632,893 B2 | 10/2003 | Konarski et al. |
| 6,833,424 B2 | 12/2004 | Milhem |
| 6,887,574 B2 | 5/2005 | Dean et al. |
| 7,037,958 B1 | 5/2006 | Hansen et al. |
| 7,163,973 B2 | 1/2007 | Ahsan |
| 7,169,876 B2 | 1/2007 | Asher |
| 7,655,174 B2 | 2/2010 | Patel et al. |
| 7,923,073 B2 | 4/2011 | Verghese et al. |
| 3,048,819 A1 | 11/2011 | Rubinszlajn et al. |
| 2005/0215670 A1 | 9/2005 | Shimasaki |
| 2006/0247371 A1 | 11/2006 | Mundstock et al. |
| 2007/0221890 A1 | 9/2007 | Gan |
| 2013/0075083 A1* | 3/2013 | Gard .................. F16L 58/182 |
| | | 166/242.6 |

FOREIGN PATENT DOCUMENTS

| | | |
|---|---|---|
| GB | 2401873 A | 11/2004 |
| JP | S63119880 A | 5/1988 |
| JP | H11158436 A | 6/1999 |

* cited by examiner

WATERBORNE COMPOSITIONS CONTAINING INORGANIC ION-EXCHANGERS TO IMPROVE CORROSION RESISTANCE

CROSS-REFERENCE TO RELATED APPLICATION

This application is a divisional application of co-pending application U.S. Ser. No. 16/015,978, filed Jun. 22, 2018, which is incorporated herein by reference.

FIELD OF THE INVENTION

The present invention relates in general to corrosion resistance and more specifically to waterborne compositions containing inorganic ion-exchangers which provide substrates with improved corrosion resistance, particularly in moist, halide-containing environments.

BACKGROUND OF THE INVENTION

There are a number of moist, halide containing-environments to which substrates may be exposed and consequently undergo accelerated corrosion. Coastal regions, marine environments, offshore emplacements such as oil & gas rigs, locations treated with road salt to melt ice and snow, etc.

As one example, there are more than 3,000 oil & gas platforms operating in offshore waters near the United States coasts. Many parts of the platforms are made of metal. Such marine environments provide a damp or moist, high salt (e.g., sodium, calcium and magnesium chlorides) setting which tends to accelerate the corrosion of metal parts. It is neither practical nor economical to move oil & gas platforms to drier, lower salt environments for routine repainting in efforts to combat corrosion damage. Likewise, bridges and other structures in coastal regions generally are not capable of movement to other areas for repainting. Repainting is therefore a continuous, or nearly continuous, process which can consume large amounts of time, money and manpower. Current corrosion protection efforts typically rely on surface-tolerant, epoxy coatings and not zinc-rich primers for maintenance.

Thus, there is a significant need for improved corrosion protection for such halide-containing environments. This corrosion protection should tolerate salt (e.g., sodium, calcium and magnesium chlorides) contamination; should perform well on poorly prepared or unprepared surfaces; and should work well on damp, moist surfaces.

SUMMARY OF THE INVENTION

Accordingly, the present invention reduces problems inherent in the art by providing waterborne compositions containing inorganic ion-exchangers which provide substrates with improved corrosion resistance, particularly in moist, halide-containing environments. The inventive compositions tolerate salt contamination well; perform well on poorly prepared or unprepared surfaces; and perform well on moist, damp surfaces. The inventive waterborne compositions may prove beneficial in or as coatings, paints, adhesives, sealants, composites, castings, and surface treatments, for substrates which are exposed to moist, halide-containing environments.

These and other advantages and benefits of the present invention will be apparent from the Detailed Description of the Invention herein below.

BRIEF DESCRIPTION OF THE FIGURES

The present invention will now be described for purposes of illustration and not limitation in conjunction with the Figures, wherein.

DETAILED DESCRIPTION OF THE INVENTION

Figure 1C:
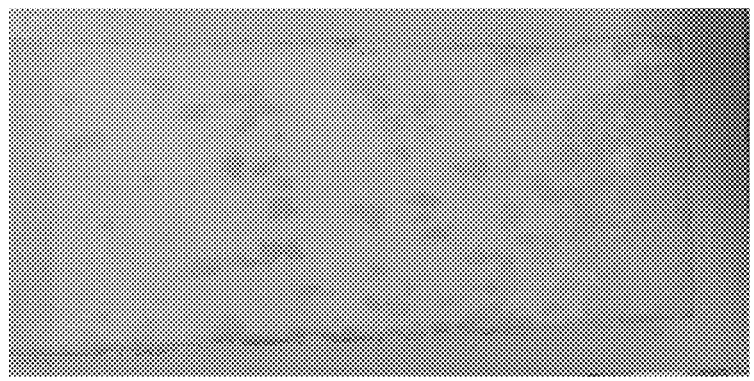
FIG. 1C shows the effect of treatment with the waterborne polyurethane composition according to Ex. 10 containing 15% of an inorganic ion-exchanger on a 0.6% (20 mg/m$^2$, 86 ppm) NaCl-contaminated steel panel humidity test for 168 hours.

The present invention will now be described for purposes of illustration and not limitation. Except in the operating examples, or where otherwise indicated, all numbers expressing quantities, percentages, and so forth in the specification are to be understood as being modified in all instances by the term "about."

Any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112(a), and 35 U.S.C. § 132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

Reference throughout this specification to "various non-limiting embodiments," "certain embodiments," or the like, means that a particular feature or characteristic may be included in an embodiment. Thus, use of the phrase "in various non-limiting embodiments," "in certain embodiments," or the like, in this specification does not necessarily refer to a common embodiment, and may refer to different embodiments. Further, the particular features or characteristics may be combined in any suitable manner in one or more embodiments. Thus, the particular features or characteristics illustrated or described in connection with various or certain embodiments may be combined, in whole or in part, with the features or characteristics of one or more other embodiments without limitation. Such modifications and variations are intended to be included within the scope of the present specification.

The grammatical articles "a", "an", and "the", as used herein, are intended to include "at least one" or "one or more", unless otherwise indicated, even if "at least one" or "one or more" is expressly used in certain instances. Thus, these articles are used in this specification to refer to one or more than one (i.e., to "at least one") of the grammatical objects of the article. By way of example, and without limitation, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

Although compositions and methods are described in terms of "comprising" various components or steps, the compositions and methods can also "consist essentially of" or "consist of" the various components or steps.

In a first aspect, the invention is directed to an anti-corrosion composition comprising an inorganic ion-exchanger and a waterborne resin, wherein a substrate exposed to a halide-containing environment and having the anti-corrosion composition applied thereto has a reduced level of corrosion compared to the substrate exposed to the halide-containing environment without the anti-corrosion composition being applied. The inventive waterborne anti-corrosion composition may find use in or as coatings, paints, adhesives, sealants, composites, castings, and surface treatments, for substrates such as automotive vehicles, bridges, cranes, superstructures, offshore oil & gas rigs, pipes, tanks, ships, barges, boats, aircraft, concrete, and masonry that are exposed to halide-containing environments.

In another aspect, the invention is directed to an anti-corrosion composition comprising an inorganic ion-exchanger and a waterborne resin, wherein a substrate having the anti-corrosion composition applied thereto and exposed to a halide-containing environment has a reduced level of corrosion compared to the substrate exposed to the halide-containing environment without the anti-corrosion composition being applied.

In still another aspect, the invention is directed to a substrate having applied thereto an anti-corrosion composition comprising an inorganic ion-exchanger and a waterborne resin, wherein the substrate exposed to a halide-containing environment and having the anti-corrosion composition applied thereto has a reduced level of corrosion compared to the substrate exposed to the halide-containing environment without the anti-corrosion composition being applied.

In yet another aspect, the invention is directed to a substrate having applied thereto an anti-corrosion composition comprising an inorganic ion-exchanger and a waterborne resin, wherein the substrate having the anti-corrosion composition applied thereto and exposed to a halide-containing environment has a reduced level of corrosion compared to the substrate exposed to the halide-containing environment without the anti-corrosion composition being applied.

In a further aspect, the invention is directed to a method of imparting corrosion resistance to a substrate comprising exposing the substrate to a halide-containing environment, applying to the substrate an anti-corrosion composition comprising an inorganic ion-exchanger and a waterborne resin, and curing the anti-corrosion composition, wherein the substrate exposed to a halide-containing environment and having the anti-corrosion composition applied thereto has a reduced level of corrosion compared to the substrate exposed to the halide-containing environment without the anti-corrosion composition being applied.

In a yet further aspect, the present invention is directed to a method of imparting corrosion resistance to a substrate comprising applying to the substrate an anti-corrosion composition comprising an inorganic ion-exchanger and a waterborne resin, exposing the substrate to a halide-containing environment, and optionally curing the anti-corrosion composition, wherein the substrate having the anti-corrosion composition applied thereto and exposed to a halide-containing environment has a reduced level of corrosion compared to the substrate exposed to the halide-containing environment without the anti-corrosion composition being applied.

As used herein, the term "waterborne resin" refers to a composition, preferably a dispersion, which contains water as its primary liquid component. Suitable waterborne resins include, but are not limited to, waterborne polyurethanes, waterborne polyureas, waterborne polyurethane-polyureas, waterborne polyaspartates, waterborne polyacrylates, waterborne alkyds, waterborne siloxanes, waterborne melamines, and waterborne epoxies.

Figure 4:
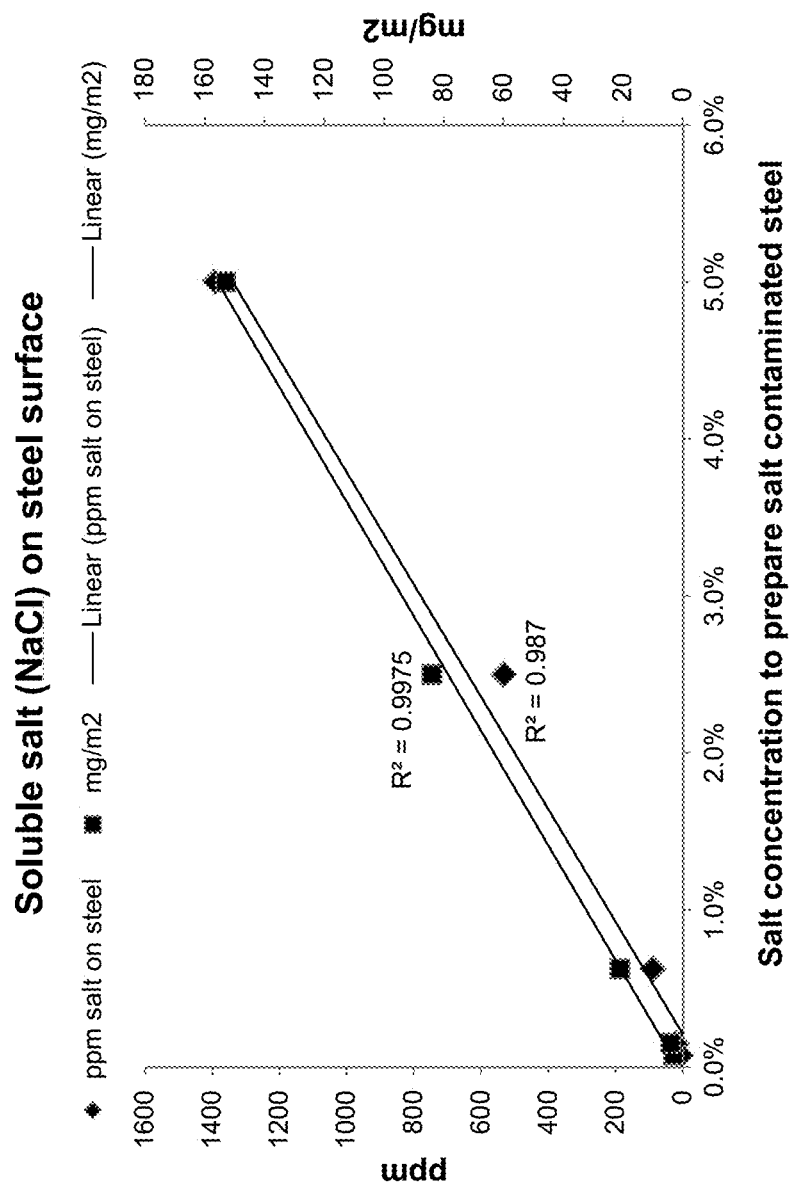
FIG. 4 is a plot of soluble salt (NaCl) on steel surface: % salt concentration vs. ppm and % salt concentration vs. mg/m$^2$.

As used herein, the term "halide-containing environment" means an environment which imparts to a substrate exposed to that environment a surface halide ion concentration in certain embodiments from greater than 0 mg/m$^2$ up to 90 mg/m$^2$, in some embodiments from 5 mg/m$^2$ to 20 mg/m$^2$, in other embodiments from 20 mg/m$^2$ to 40 mg/m$^2$, in still other embodiments from 40 mg/m$^2$ to 60 mg/m$^2$, in yet other embodiments from 60 mg/m$^2$ to 80 mg/m$^2$, and in yet still other embodiments a surface halide ion concentration of up to 90 mg/m$^2$ or more. FIG. 4 provides a plot of soluble salt (NaCl) on steel surface: % salt concentration vs. ppm and % salt concentration vs. mg/m$^2$. As will be apparent to those skilled in the art, the halide ion concentration may be in an amount ranging between any combination of these values, inclusive of the recited values.

As used herein, the terms "coating composition" and "coating" refer to a mixture of chemical components that will cure and form a coating when applied to a substrate. The coating may be in the form of a liquid or a powder coating.

As used herein, the term "binder" refers to the component of a two-component coating composition that comprises an isocyanate-reactive resin.

As used herein, the terms "hardener" and "crosslinker" are synonymous and refer to the component of a two-component coating composition that comprises a polyisocyanate.

The terms "adhesive" and "adhesive compound", refer to any substance that can adhere or bond two items together. Implicit in the definition of an "adhesive composition" and an "adhesive formulation" is the concept that the composition or formulation is a combination or mixture of more than one species, component or compound, which can include adhesive monomers, oligomers, and polymers along with other materials.

A "sealant composition" and a "sealant" refer to a composition which may be applied to one or more surfaces to form a protective barrier, for example, to prevent ingress or egress of solid, liquid or gaseous material or alternatively to allow selective permeability through the barrier to gas and liquid. In particular, it may provide a seal between surfaces.

A "casting composition" and a "casting" refer to a mixture of liquid chemical components which is usually poured into a mold containing a hollow cavity of the desired shape, and then allowed to solidify.

A "composite" refers to a material made from two or more polymers, optionally containing other kinds of materials. A composite has different properties from those of the individual polymers/materials which make it up.

"Cured," "cured composition" or "cured compound" refers to components and mixtures obtained from reactive curable original compound(s) or mixture(s) thereof which have undergone a chemical and/or physical changes such that the original compound(s) or mixture(s) is(are) transformed into a solid, substantially non-flowing material. A typical curing process may involve crosslinking.

The term "curable" means that an original compound(s) or composition material(s) can be transformed into a solid, substantially non-flowing material by means of chemical reaction, crosslinking, radiation crosslinking, or the like. Thus, compositions of the invention are curable, but unless otherwise specified, the original compound(s) or composition material(s) is(are) not cured.

As used herein "ion-exchanger" refers to a natural or synthetic material that acts as a medium for ion exchange. Such materials include, but are not limited to zeolites, polybasic acids salts of metals belonging to groups IV, V and VI of the Periodic Table of the Elements, hydrous oxides of metal ions, chelates, amidoximes, kaolin, hydrotalcites, and insoluble metal ferrocyanides.

As used herein, "polymer" encompasses prepolymers, oligomers and both homopolymers and copolymers; the prefix "poly" in this context referring to two or more.

As used herein, "molecular weight", when used in reference to a polymer, refers to the number average molecular weight ("$M_n$"), unless otherwise specified.

As used herein, the $M_n$ of a polymer containing functional groups, such as a polyol, can be calculated from the functional group number, such as hydroxyl number, which is determined by end-group analysis.

As used herein, the term "aliphatic" refers to organic compounds characterized by substituted or un-substituted straight, branched, and/or cyclic chain arrangements of constituent carbon atoms. Aliphatic compounds do not contain aromatic rings as part of the molecular structure thereof.

As used herein, the term "cycloaliphatic" refers to organic compounds characterized by arrangement of carbon atoms in closed ring structures. Cycloaliphatic compounds do not contain aromatic rings as part of the molecular structure thereof. Therefore, cycloaliphatic compounds are a subset of aliphatic compounds. Therefore, the term "aliphatic" encompasses aliphatic compounds and cycloaliphatic compounds.

As used herein, "diisocyanate" refers to a compound containing two isocyanate groups. As used herein, "polyisocyanate" refers to a compound containing two or more isocyanate groups. Hence, diisocyanates are a subset of polyisocyanates.

As used herein, the term "dispersion" refers to a composition comprising a discontinuous phase distributed throughout a continuous phase. For example, "waterborne dispersion" and "aqueous dispersion" refer to compositions comprising particles or solutes distributed throughout liquid water. Waterborne dispersions and aqueous dispersions may also include one or more co-solvents in addition to the particles or solutes and water. As used herein, the term "dispersion" includes, for example, colloids, emulsions, suspensions, sols, solutions (i.e., molecular or ionic dispersions), and the like.

As used herein, the term "aqueous polyurethane dispersion" means a dispersion of polyurethane particles in a continuous phase comprising water. As used herein, the term "polyurethane" refers to any polymer or oligomer comprising urethane (i.e., carbamate) groups, urea groups, or both. Thus, the term "polyurethane" as used herein refers collectively to polyurethanes, polyureas, and polymers containing both urethane and urea groups, unless otherwise indicated.

Suitable polyisocyanates useful in various embodiments of the invention include organic diisocyanates represented by the formula $$R(NCO)_2$$

wherein R represents an organic group obtained by removing the isocyanate groups from an organic diisocyanate having (cyclo)aliphatically bound isocyanate groups and a molecular weight of 112 to 1,000, preferably 140 to 400. Preferred diisocyanates for the invention are those represented by the formula wherein R represents a divalent aliphatic hydrocarbon group having from 4 to 18 carbon atoms, a divalent cycloaliphatic hydrocarbon group having from 5 to 15 carbon atoms, or a divalent araliphatic hydrocarbon group having from 7 to 15 carbon atoms.

Examples of the organic diisocyanates which are particularly suitable for the present invention include 1,4-tetramethylene diisocyanate, 1,6-hexamethylene diisocyanate (HDI), 2,2,4-trimethyl-1,6-hexamethylene diisocyanate, 1,12-dodecamethylene diisocyanate, cyclohexane-1,3- and 1,4-diisocyanate, 1-isocyanato-2-isocyanato-methyl cyclopentane, 1-isocyanato-3-isocyanatomethyl-3,5,5-trimethyl cyclohexane (isophorone diisocyanate or IPDI), bis-(4-isocyanatocyclohexyl)methane, 1,3- and 1,4-bis(isocyanatomethyl)-cyclohexane, bis-(4-isocyanato-3-methyl-cyclohexyl)-methane, α,α,α',α'-tetramethyl-1,3- and 1,4-xylene diisocyanate, 1-isocyanato-1-methyl-4(3)-isocyanatomethyl cyclohexane, and 2,4- and 2,6-hexahydrotoluene diisocyanate, toluene diisocyanate (TDI), diphenylmethane diisocyanate (MDI), pentane diisocyanate (PDI)—bio-based, and, isomers of any of these; or combinations of any of these. Mixtures of diisocyanates may also be used. Preferred diisocyanates include 1,6-hexamethylene diisocyanate, isophorone diisocyanate, and bis(4-isocyanatocyclohexyl)-methane because they are readily available and yield relatively low viscosity polyuretdione polyurethane oligomers.

In some embodiments, the polyisocyanate comprises a derivative of any of the foregoing monomeric polyisocyanates, such as a derivative containing one or more of biuret groups, isocyanurate groups, urethane groups, carbodiimide groups, and allophanate groups.

Specific examples of suitable modified polyisocyanates include N,N',N"-tris-(6-isocyanatohexyl)-biuret and mixtures thereof with its higher homologues and N,N',N"-tris-(6-isocyanatohexyl)-isocyanurate and mixtures thereof with its higher homologues containing more than one isocyanurate ring.

Isocyanate group-containing prepolymers and semi-prepolymers based on the monomeric simple or modified polyisocyanates exemplified above and organic polyhydroxyl compounds are also suitable for use as a polyisocyanate in the anti-corrosion compositions of the present invention. These prepolymers and semi-prepolymers often have an isocyanate content of 0.5% to 30% by weight, such as 1% to 20% by weight or 10% to 20% by weight, and can be prepared, for example, by reaction of polyisocyanate(s) with polyhydroxyl compound(s) at an NCO/OH equivalent ratio of 1.05:1 to 10:1, such as 1.1:1 to 3:1, this reaction may be followed by distillative removal of any unreacted volatile starting polyisocyanates still present.

The prepolymers and semi-prepolymers may be prepared, for example, from low molecular weight polyhydroxyl compounds having a molecular weight of 62 to 299, specific examples of which include, but are not limited to, ethylene glycol, propylene glycol, trimethylol propane, 1,6-dihydroxy hexane; low molecular weight, hydroxyl-containing esters of these polyols with dicarboxylic acids; low molecular weight ethoxylation and/or propoxylation products of these polyols; and mixtures of the preceding polyvalent modified or unmodified alcohols.

In certain embodiments, the prepolymers and semi-prepolymers are prepared from a relatively high molecular weight polyhydroxyl compound having a molecular weight of 300 to 8,000, such as 1,000 to 5,000, as determined from the functionality and the OH number. These polyhydroxyl compounds have at least two hydroxyl groups per molecule and generally have a hydroxyl group content of 0.5% to 17% by weight, such as 1% to 5% by weight.

Examples of suitable relatively high molecular weight polyhydroxyl compounds which may be used for the preparation of the prepolymers and semi-prepolymers include polyester polyols based on the previously described low molecular weight, monomeric alcohols and polybasic carboxylic acids such as adipic acid, sebacic acid, phthalic acid, isophthalic acid, tetrahydrophthalic acid, hexahydrophthalic acid, maleic acid, the anhydrides of these acids and mixtures of these acids and/or acid anhydrides. Hydroxyl group-containing polylactones, especially poly-ε-caprolactones, are also suitable for the preparation of the prepolymers and semi-prepolymers.

Polyether polyols, which can be obtained by the alkoxylation of suitable starting molecules, are also suitable for the preparation of the isocyanate group-containing prepolymers and semi-prepolymers. Examples of suitable starting molecules for the polyether polyols include the previously described monomeric polyols, water, organic polyamines having at least two NH bonds and any mixtures of these starting molecules. Ethylene oxide and/or propylene oxide are exemplary suitable alkylene oxides for the alkoxylation reaction. These alkylene oxides may be introduced into the alkoxylation reaction in any sequence or as a mixture.

Also suitable for the preparation of the prepolymers and semi-prepolymers are hydroxyl group-containing polycarbonates which may be prepared by the reaction of the previously described monomeric diols with phosgene and diaryl carbonates such as diphenyl carbonate.

In certain embodiments, the polyisocyanate comprises an asymmetric diisocyanate trimer (iminooxadiazine dione ring structure) such as, for example, the asymmetric diisocyanate trimers described in U.S. Pat. No. 5,717,091, which is incorporated by reference into this specification. In certain embodiments, the polyisocyanate comprises an asymmetric diisocyanate trimer based on hexamethylene diisocyanate (HDI), 1-isocyanato-3,3,5-trimethyl-5-isocyanatomethyl-cyclohexane (IPDI); or a combination thereof.

The anti-corrosion compositions of the present invention may also comprise a polymeric polyol. As will be appreciated, the polymeric polyol is distinct from, and in addition to, any polymeric polyol that may be used to prepare an isocyanate group-containing prepolymer or semi-prepolymer described above with respect to the polyisocyanate. In certain embodiments, the polymeric polyol comprises acid, such as carboxylic acid, functional groups.

Polymeric polyols suitable for use in the anti-corrosion compositions of various embodiments of the invention include polyester polyols, polyether polyols, and polycarbonate polyols, such as those described above with respect to the preparation of isocyanate group-containing prepolymers or semi-prepolymers.

In certain embodiments of the anti-corrosion compositions of the present invention, the polymeric polyol comprises an acrylic polyol, including acrylic polyols that contain acid, such as carboxylic acid, functional groups. Acrylic polyols suitable for use in the anti-corrosion compositions of the present invention include hydroxyl-containing copolymers of olefinically unsaturated compounds, such as those polymers that have a number average molecular weight ($M_n$) determined by vapor pressure or membrane osmometry of 800 to 50,000, such as 1,000 to 20,000, or, in some cases, 5,000 to 10,000, and/or having a hydroxyl group content of 0.1 to 12% by weight, such as 1 to 10% by weight and, in some cases, 2 to 6% by weight and/or having an acid value of at least 0.1 mg KOH/g, such as at least 0.5 mg KOH/g and/or up to 10 mg KOH/g or, in some cases, up to 5 mg KOH/g.

Often, the copolymers are based on olefinic monomers containing hydroxyl groups and olefinic monomers which are free from hydroxyl groups. Examples of suitable olefinic monomers that are free of hydroxyl groups include vinyl and vinylidene monomers, such as styrene, a-methyl styrene, o- and p-chloro styrene, o-, m- and p-methyl styrene, p-tert-butyl styrene; acrylic acid; methacrylic acid; (meth)acrylonitrile; acrylic and methacrylic acid esters of alcohols containing 1 to 8 carbon atoms, such as ethyl acrylate, methyl acrylate, n- and iso-propyl acrylate, n-butyl acrylate, 2-ethylhexyl acrylate, 2-ethylhexyl methacrylate, iso-octyl acrylate, methyl methacrylate, ethyl methacrylate, butyl methacrylate and iso-octyl methacrylate; diesters of fumaric acid, itaconic acid or maleic acid having four to eight carbon atoms in the alcohol component; (meth)acrylic acid amide; and vinyl esters of alkane monocarboxylic acids having two to five carbon atoms, such as vinyl acetate or vinyl propionate.

Examples of suitable olefinic monomers containing hydroxyl groups are hydroxyalkyl esters of acrylic acid or methacrylic acid having two to four carbon atoms in the hydroxyalkyl group, such as 2-hydroxyethyl(meth)acrylate, 2-hydroxypropyl(meth)acrylate, 4-hydroxybutyl(meth)acrylate and trimethylolpropane-mono- or pentaerythritol mono-(meth)acrylate. Mixtures of the monomers exemplified above may also be used for the preparation of the acrylic polyol. As will be appreciated, (meth)acrylate and (meth) acrylic are meant to encompass methacrylate and acrylate or methacrylic and acrylics, as the case may be. Mixtures of the various polymeric polyols described above may be used.

The compositions of the present invention also comprise a polyaspartic ester corresponding to the formula (I):

(I)

wherein: X is an aliphatic residue, $R^1$ and $R^2$ are organic groups that are inert to isocyanate groups at a temperature of 100° C. or less and may be the same or different organic groups, and n is an integer having a value of at least 2, such as 2 to 6 or 2 to 4.

In certain embodiments, X in formula (I) is a straight or branched alkyl and/or cycloalkyl residue of an n-valent polyamine that is reacted with a dialkylmaleate in a Michael addition reaction to produce a polyaspartic ester. For example, X may be an aliphatic residue from an n-valent polyamine including, but not limited to, ethylene diamine; 1,2-diaminopropane; 1,4-diaminobutane, 1,6-diamino-hexane, 2,5-diamino-2,5-dimethylhexane; 2,2,4- and/or 2,4,4-trimethyl-1,6-diaminohexane, 1,11-diaminoundecane; 1,12-diaminododecane, 1-amino-3,3,5-trimethyl-5-amino-methylcyclohexane; 2,4'- and/or 4,4'-diaminodicyclohexylmethane; 3,3'-dimethyl-4,4'-diaminodicyclohexylmethane; 2,4,4'-triamino-5-methyldicyclohexylmethane; polyether polyamines with aliphatically bound primary amino groups and having a number average molecular weight ($M_n$) of 148 to 6,000 g/mol; isomers of any thereof, and combinations of any thereof.

In certain embodiments, X may be obtained from 1,4-diaminobutane; 1,6-diaminohexane, 2,2,4- and/or 2,4,4-trimethyl-1,6-diaminohexane, 1-amino-3,3,5-trimethyl-5-aminomethylcyclohexane; 4,4'-diaminodicyclohexylmethane; 3,3'-dimethyl-4,4'-diaminodicyclo-hexylmethane; or 1,5-diamine-2-methylpentane.

As used herein, the phrase "inert to isocyanate groups," which is used to define groups $R_1$ and $R_2$ in formula (I), means that these groups do not have Zerevitinov-active hydrogens. Zerevitinov-active hydrogen is defined in Rompp's Chemical Dictionary (Rompp Chemie Lexikon), 10$^{th}$ ed., Georg Thieme Verlag Stuttgart, 1996, which is incorporated herein by reference. Generally, groups with Zerevitinov-active hydrogen are understood in the art to mean hydroxyl (OH), amino ($NH_x$), and thiol (SH) groups. In various embodiments, $R_1$ and $R_2$, independently of one another, are $C_1$ to $C_{10}$ alkyl residues, such as, for example, methyl, ethyl, or butyl residues.

In certain embodiments, n in formula (I) is an integer having a value of from 2 to 6, such as from 2 to 4, and in some embodiments, n is 2.

The polyaspartic ester present in the anti-corrosion compositions of the present invention may be produced by reacting a primary polyamine of the formula:

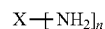

with maleic or fumaric acid esters of the formula:

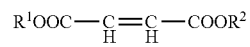

wherein X, n, $R^1$ and $R^2$ are as described earlier with respect to formula (I).

Examples of suitable polyamines include the above-mentioned diamines. Examples of suitable maleic or fumaric acid esters include dimethyl maleate, diethyl maleate, dibutyl maleate, and the corresponding fumarates.

The production of the polyaspartic ester from the above-mentioned polyamine and maleic/fumaric acid ester starting materials may take place within a temperature range of, for example, 0° C. to 100° C. The starting materials may be used in amounts such that there is at least one equivalent, and in some embodiments approximately one equivalent, of olefinic double bonds in the maleic/fumaric acid esters for each equivalent of primary amino groups in the polyamine. Any starting materials used in excess may be separated off by distillation following the reaction. The reaction may take place in the presence or absence of suitable solvents, such as methanol, ethanol, propanol, dioxane, or combinations of any thereof.

In certain embodiments, the polyaspartic ester comprises a reaction product of two equivalents of diethyl maleate with one equivalent of 3,3'-dimethyl-4,4'-diaminodicyclohexyl-methane. Such a reaction product has the following molecular structure:

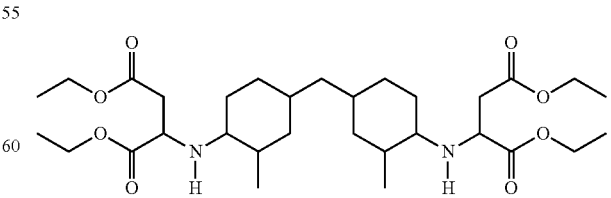

In certain embodiments, the polyaspartic ester comprises a mixture of any two or more polyaspartic esters.

Examples of suitable polyaspartic esters that may be used in the anti-corrosion compositions of the present invention are also described in U.S. Pat. Nos. 5,126,170; 5,236,741; 5,489,704; 5,243,012; 5,736,604; 6,458,293; 6,833,424; 7,169,876; and in U.S. Patent Publication No. 2006/0247371, In addition, suitable polyaspartic esters are commercially available from Covestro LLC, Pittsburgh, Pa., USA, under the DESMOPHEN trade name.

Water-dispersible epoxy resins used in accordance with the present invention have an average molecular weight of 500 to 20,000 and are prepared from a dihydric phenol and the diglycidyl ether of a dihydric phenol. To provide hydrophilicity to the epoxy resin, either chemically incorporated or external emulsifiers may be used. Suitable emulsifiers are anionic, cationic or nonionic. Both the dihydric phenol and the diglycidyl ether of a dihydric phenol may also contain other substituents such as alkyl, aryl, sulfido, sulfonyl, halo, etc.

Illustrative of suitable dihydric phenols are 2,2-bis(4-hydroxyphenyl)propane, 2,2-bis(3-bromo-4-hydroxyphenyl)propane, 2,2-bis(3-chloro-4-hydroxyphenyl)-propane, bis(4-hydroxyphenyl)methane, bis(4-hydroxyphenyl) sulfone, bis(4-hydroxyphenyl)-sulfide, resorcinol, hydroquinone, and the like. The preferred dihydric phenols are 2,2-bis(4-hydroxyphenyl)propane (bisphenol A) and bis(4-hydroxyphenyl)methane for reasons of cost and availability.

The diglycidyl ether derivatives are prepared by the reaction of a dihydric phenol with a halogen-containing epoxide or dihalohydrin in the presence of an alkaline medium. By varying the ratios of the dihydric phenol and epichlorohydrin reactants, different molecular weight products can be obtained as described in U.S. Pat. Nos. 2,582,985; 2,615,007 and 2,633,458.

For purposes of the present invention, optionally at least a portion of the diglycidyl ether of dihydric phenol component can be replaced with a diglycidyl ether of a hydrogenated dihydric phenol derivative. For example, the diglycidyl ether of dihydric phenol can have up to essentially 100 percent of its weight substituted by a diglycidyl alicyclic ether such as 2,2-bis(4-hydroxycyclohexyl)propane or bis(4-hydroxycyclohexyl)methane.

To make the epoxy resins water-dispersible, one of an anionic, cationic and nonionic external emulsifier is added to the resin and one of an anionic, cationic and nonionic emulsifier is chemically incorporated into the epoxy resin. The nonionic emulsifiers contain repeating alkylene oxide units, preferably ethylene oxide units, and have average molecular weights between 400 and 24,000.

Suitable nonionic external emulsifiers are disclosed in U.S. Pat. No. 4,073,762 and include those of the alkylaryl type such as polyoxyethylene nonyl phenyl ether or polyoxyethylene octyl phenyl ether; those of the alkyl ether type such as polyoxyethylene lauryl ether or polyoxyethylene oleyl ether; those of the alkyl ester type such as polyoxyethylene laurate, polyoxyethylene oleate or polyoxyethylene stearate, and those of the polyoxyethylene benzylated phenyl ether type. In addition, reaction products of polyethylene glycols with aromatic diglycidyl compounds such as those disclosed in U.S. Pat. No. 5,034,435 may also be used as nonionic external emulsifiers. The epoxy resin component may contain from 1 to 20%, preferably 2 to 15%, by weight of nonionic external emulsifier, based on the weight of the epoxy resin component.

Chemically incorporated nonionic emulsifiers are based on polyoxyalkylene glycols which are soluble or at least partially soluble in water. Polyoxyalkylene glycols are prepared conveniently by the condensation of an alkylene oxide with a suitable polyhydric alcohol. Illustrative of alkylene oxides are ethylene oxide and propylene oxide and mixtures thereof. Illustrative of polyhydric alcohols are aliphatic alcohols such as ethylene glycol, 1,3-propylene glycol, 1,2-propylene glycol, 1,4-butylene glycol, 1,3-butylene glycol, 1,2-butylene glycol, 1,5-pentanediol, 1,4-pentanediol, 1,3-pentanediol, 1,6-hexanediol, 1,7-heptanediol, glycerol, 1,1,1-trimethylol-propane, 1,1,1-trimethylolethane, hexane 1,2,6-triol, pentaerythritol, sorbitol, 2,2-bis(4-hydroxycyclohexyl)propane, and the like.

Preferred polyoxyalkylene glycols are those prepared by the reaction of one or more of ethylene oxide and propylene oxide with a dihydric aliphatic alcohol, e.g., ethylene glycol. Illustrative of polyoxyalkylene glycols are commercial PLURONIC type products (available from BASF) which are block copolymers of ethylene oxide and propylene oxide of 5,000-10,000 molecular weight, containing from 50 to 90 weight percent ethylene oxide and 10 to 50 weight percent propylene oxide.

The polyoxyalkylene glycols may be chemically incorporated through reaction of their hydroxyl groups with the epoxide rings of the epoxy resins as disclosed in U.S. Pat. No. 4,048,179. However, this method is not preferred because it reduces the number of epoxide groups available for cross-linking with the water-dispersible blocked polyisocyanate component of the present invention. Thus, it is preferred to convert the polyoxyalkylene glycol into its diglycidyl ether prior to chemically incorporating it into the epoxy resin. These diglycidyl ethers may be conveniently prepared by reacting epichlorohydrin with a selected polyoxyalkylene glycol in a molar proportion which provides substantially a diglycidyl ether reaction product. The epoxy resins may contain from 1 to 20%, preferably from 2 to 15%, by weight of chemically incorporated polyoxyalkylene glycols or their diglycidyl ethers.

A preferred epoxy resin containing chemically incorporated nonionic groups is the addition product of reactants comprising (i) 50 to 90 parts by weight of the diglycidyl ether of a dihydric phenol, (ii) 8 to 35 parts by weight of a dihydric phenol and (iii) 2 to 1, parts by weight of the diglycidyl ether of a polyoxyalkylene glycol, wherein the average molecular weight of the epoxy resin is 500 to 20,000.

Suitable compounds for preparing epoxy resins containing chemically incorporated anionic or cationic groups are those known in the art.

The epoxy-based resins, used in the embodiments of the present invention, may vary and include conventional and commercially available epoxy resins, which may be used alone or in combinations of two or more. In choosing epoxy resins for anti-corrosion compositions disclosed herein, consideration should not only be given to properties of the final product, but also to viscosity and other properties that may influence the processing of the resin composition.

Particularly suitable epoxy resins known to the skilled worker are based on reaction products of polyfunctional alcohols, phenols, cycloaliphatic carboxylic acids, aromatic amines, or aminophenols with epichlorohydrin. A few non-limiting embodiments include, for example, bisphenol A diglycidyl ether, bisphenol F diglycidyl ether, resorcinol diglycidyl ether, and triglycidyl ethers of para-aminophenols. Other suitable epoxy resins known to the skilled worker include reaction products of epichlorohydrin with o-cresol and, respectively, phenol novolacs. It is also possible to use a mixture of two or more epoxy resins.

Suitable epoxy resins for the present invention are disclosed in, for example, U.S. Pat. Nos. 3,018,262; 5,405,688; 6,153,719; 6,242,083; 6,572,971; 6,632,893; 6,887,574; 7,037,958; 7,163,973; 7,655,174; 7,923,073; and 8,048,819;

and in U.S. Published Patent Application No. 2007/0221890; each of which is hereby incorporated herein by reference.

In general, the choice of the epoxy resin used in the present invention depends on the application. However, diglycidyl ether of bisphenol A (DGEBA) and derivatives thereof are particularly preferred. Other epoxy resins can be selected from: bisphenol F epoxy resins, novolac epoxy resins, glycidylamine-based epoxy resins, alicyclic epoxy resins, linear aliphatic and cycloaliphatic epoxy resins, tetrabromobisphenol A epoxy resins, and combinations thereof.

In some embodiments, the concentration of the epoxy resin may be from between 1 wt. % to 99 wt. %, in other embodiments between 20 wt. % to 80 wt. %, and in certain embodiments between 30 wt. % to 60 wt. % based on the total weight of the composition.

Suitable polyacrylate or polystyrene-acrylate based compositions include a polyacrylate or polystyrene component including but not limited to, styrene, methacrylic acid, butyl acrylate, and methylacrylate, isobutyl methacrylate derived monomeric units. Waterborne polyacrylates are commercially available from Covestro as BAYHYDROL A polyacrylates or BAYHYDROL UA polyurethane/polyacrylate (PU/PA) hybrid dispersions.

Inorganic ion-exchangers include many natural mineral compounds, such as clays (e.g., bentonite, kaolinite, and illite), vermiculite, and zeolites (e.g., analcite, chabazite, sodalite, and clinoptilolite). Also useful are metal phosphates and heteropolyoxometalates, polybasic acid salts, hydrous oxides of some metal ions, Insoluble metal ferrocyanides, and heteropolyacids.

It will be apparent to those skilled in the art that various combinations of inorganic ion-exchangers may be used in the invention such as a mixture of a strong acidic cationic-type ion-exchanger and a strong basic anionic-type ion-exchanger; a mixture of a strong acidic cationic-type ion-exchanger and a weak basic anionic-type ion-exchanger; a weak acidic cationic-type ion-exchanger and a strong basic anionic-type ion-exchanger; and a mixture of a weak acidic cationic-type ion-exchanger and a weak basic anionic-type ion-exchanger. In some embodiments, the ion-exchanger may have both an acidic and a basic moiety. Such ion-exchangers are referred to as amphoteric. The inventive waterborne anti-corrosion compositions encompass and include all such ion-exchangers and combinations and mixtures.

The waterborne anti-corrosion compositions of the present invention may further comprise any of a variety of conventional auxiliary agents or additives, such as, but not limited to, defoamers, rheology modifiers (e.g., thickeners), leveling agents, flow promoters, colorants, fillers, UV stabilizers, dispersing agents, catalysts, anti-skinning agents, anti-sedimentation agents, emulsifiers, and/or organic solvents.

Certain embodiments of the present invention are directed to methods for applying the waterborne anti-corrosion compositions to a metal substrate in a high salt environment such as on an offshore oil & gas platform. Specific examples of suitable substrate metals include, but are not limited to, stainless steel, cold rolled steel, hot rolled steel, steel coated with zinc metal, zinc compounds, or zinc alloys, such as electrogalvanized steel, hot-dipped galvanized steel, galvanealed steel, and steel plated with zinc alloy. Also, aluminum alloys, aluminum plated steel and aluminum alloy plated steel may be used. Other suitable non-ferrous metals include copper and magnesium, as well as alloys of these materials. The metal may be in the form of, for example, a sheet of metal or a fabricated part.

In various embodiments of the methods of the present invention, after the substrate is dipped or immersed in the pretreatment composition, in various other embodiments, the substrate is sprayed with the pretreatment composition, it is then contacted with the inventive waterborne anti-corrosion compositions comprising a film-forming resin. Any suitable technique may be used to contact the substrate with the inventive waterborne anti-corrosion compositions, including, for example, spraying, dipping, flow coating, rolling, brushing, pouring, and the like. In various embodiments, the inventive waterborne anti-corrosion compositions may be applied in the form of paints or lacquers onto any compatible substrate, such as, for example, metals, plastics, ceramics, glass, and natural materials. In certain preferred embodiments, the waterborne anti-corrosion composition is applied as a single layer. In various embodiments, a topcoat may be applied to the layer of waterborne anti-corrosion composition. In certain other embodiments, the waterborne anti-corrosion composition may be applied as a powder coating.

The substrate may be exposed to the halide-containing environment before or after the waterborne anti-corrosion composition is applied. Although not wishing to be bound to any particular theory, the inventors believe the order of steps, e.g., exposure to the halide-containing environment followed by application of the inventive waterborne anti-corrosion composition or application of the waterborne inventive anti-corrosion composition followed by exposure to the halide-containing environment is not critical to the operation of the invention. Thus, the present invention is intended to encompass both orders of steps.

The waterborne anti-corrosion compositions of the present invention may be admixed and combined with conventional paint-technology binders, auxiliaries and additives, selected from the group of pigments, dyes, matting agents, flow control additives, wetting additives, slip additives, metallic effect pigments, fillers, nanoparticles, light stabilizing particles, anti-yellowing additives, thickeners, and additives for reducing the surface tension.

EXAMPLES

The non-limiting and non-exhaustive examples that follow are intended to further describe various non-limiting and non-exhaustive embodiments without restricting the scope of the embodiments described in this specification. All quantities given in "parts" and "percents" are understood to be by weight, unless otherwise indicated.

The following materials were used in the Examples described herein:

| | |
|---|---|
| DISPERSION A | an anionic polyacrylate dispersion, commercially available from Covestro as BAYHYDROL A 2542; |
| POLYASPARTATE A | a 100% solids content aspartic ester functional amine, having an amine number of approx. 201 mgKOH/g, viscosity @ 25° C. of 1450 mPa•s, commercially available from Covestro as DESMOPHEN NH 1420; |

| | |
|---|---|
| POLYASPARTATE B | a 100% solids content aspartic ester functional amine, having an amine number of approx. 191 mg KOH/g, viscosity @ 25° C. of 1400 mPa•s, commercially available from Covestro as DESMOPHEN NH 1520; |
| POLYASPARTATE C | a 100% solids content aspartic ester functional amine, having an amine number of approx. 190 mg KOH/g, viscosity @ 25° C. of 100 mPa•s, commercially available from Covestro as DESMOPHEN NH 2850 XP, |
| ISOCYANATE A | an aliphatic polyisocyanate resin based on hexamethylene diisocyanate, NCO content 23.5 ± 0.5%, viscosity 730 ± 100 mPa•s @ 23° C., commercially available from Covestro as DESMODUR N-3900, |
| ISOCYANATE B | a hydrophilic aliphatic polyisocyanate based on hexamethylene diisocyanate, NCO content 23%, 100 % weight solids, commercially available from Covestro as BAYHYDUR XP 2547; |
| IXR A | an inorganic amphoteric ion-exchanger, commercially available from Toagosei Co., LTD as IXE-600, |
| IXR B | an inorganic anionic ion-exchanger, commercially available from Toagosei Co., LTD as IXE-500, |
| IXR C | an inorganic cationic ion-exchanger, commercially available from Toagosei Co., LTD as IXE-100, |
| ADDITIVE A | a high molecular weight alkylolammonium salt of a copolymer with acidic groups for solvent-borne and water-borne systems, commercially available from BYK as DISPERBYK-180, |
| ADDITIVE B | flow promoter and deaerator, commercially available from OMG Americas, Inc. as BORCHI GOL 0011; for topcoat; |
| ADDITIVE C | a solution of copolymer with acidic groups, commercially available from BYK as DISPERBYK-110, |
| ADDITIVE D | a water-based, low-odor, low-foam corrosion inhibitor, commercially available from ICL Performance Products LP as HALOX FLASH X 150; |
| ADDITIVE E | an emulsion based on polyether and polyethersiloxane, commercially available from Evonik as TEGO FOAMEX 822; |
| ADDITIVE F | a solventless modified polysiloxane which provides high surface slip and improves flow and leveling properties, commercially available from Borchers as BORCHI GOL LA 200; |
| ADDITIVE G | a non-ionic rheology additive for aqueous systems having a viscosity @ 23° C. of 200-5,000 mPa•s, commercially available from BASF DSX 1514 (8% as supplied in DI water); |
| SOLVENT A | xylene, |
| SOLVENT B | t-butyl acetate; and |
| ZNPHOS | a white anti-corrosive pigment, commercially available from Heucotech Ltd. as ZP10 HEUCOPHOS ZINC PHOSPHATE. |

Zinc phosphate pretreated steel panels (BONDERITE 952) used in the Examples were from ACT Test Panel Technologies, 273 Industrial Drive Hillsdale, Mich. 49242.

Panel Preparation:
a) Solutions of 0.6% sodium chloride in de-ionized water were prepared (see FIG. 4 to convert the salt concentration to mg/m² and ppm);
b) the panels were submerged in the sodium chloride solution for one minute; and
c) the panels were removed from the sodium chloride solution, immediately dried with an air hose, and the halide concentration measured on the surface of the panels by an ELCOMETER 130 salt contamination meter (model T) manufactured by Elcometer Inc.

Testing Procedure:
a) A paint containing IXR at 3 levels (0%, 7.5% and 15%) was drawn down on the contaminated panel (10 mil wet);
b) the panel was heated at 80° C. for 1 hour;
c) a polyaspartate clear topcoat (15 mil wet) made according Table I was applied and cured for 7 days at ambient temperature;
d) humidity resistance was measured by Cleveland condensation test (ASTM D 2247) at 120° F. (48.9° C.) and 100% relative humidity;
e) the panel was removed from the test at the time indicated in the Examples and visually evaluated.

TABLE I

| Component 1 | |
|---|---|
| POLYASPARTATE A | 103.64 |
| POLYASPARTATE B | 207.3 |
| POLYASPARTATE C | 103.64 |
| SOLVENT B | 161.96 |
| ADDITIVE B | 7.26 |
| ADDITIVE C | 16.2 |
| Subtotal | 600 |
| Component 2 | |
| ISOCYANATE A | 268.06 |
| SOLVENT B | 32.47 |
| Subtotal | 300.53 |
| Total | 900.53 |
| Theoretical Results | |
| Weight Solids | 77.52 |
| Volume Solids | 73.29 |
| NCO:OH | 1.05 |
| PVC | 0 |
| P/B | 0 |
| Wt/Gal | 8.59 |
| Mix Ratio (volume) | 2.23:1 |
| Theoretical VOC | 1.93 |

TABLE II

| Ex. No. | 1A | 1B | 1C | 2A | 2B |
|---|---|---|---|---|---|
| Component 1 | | | | | |
| DISPERSION A | 124.64 | 66.06 | 66.06 | 124.64 | 124.64 |
| IXR A | | 6.93 | 14.4 | | |
| IXR B | | | | 9.1 | 18.2 |
| IXR C | | | | 3.9 | 7.8 |
| ADDITIVE A | 8.68 | 4.6 | 4.6 | 8.68 | 8.68 |
| Water, DI | 51.58 | 27.34 | 27.34 | 51.58 | 51.58 |
| ADDITIVE D | 1.5 | 0.8 | 0.8 | 1.5 | 1.5 |
| ADDITIVE E | 0.26 | 0.14 | 0.14 | 0.26 | 0.26 |
| ADDITIVE F | 0.26 | 0.14 | 0.14 | 0.26 | 0.26 |
| ADDITIVE G | 0.26 | 0.14 | 0.14 | 0.26 | 0.26 |
| SOLVENT A | 1.5 | 0.8 | 0.8 | 1.5 | 1.5 |
| Subtotal | 188.68 | 106.95 | 114.42 | 201.68 | 214.68 |
| Component 2 | | | | | |
| ISOCYANATE B | 111.32 | 59.4 | 63.25 | 111.32 | 111.32 |
| Subtotal | 111.32 | 59.4 | 63.25 | 111.32 | 111.32 |
| Total | 300 | 166.35 | 177.67 | 313 | 326 |
| Theoretical Results | | | | | |
| Weight Solids | 61.39 | 63.09 | 65.44 | 62.99 | 64.47 |
| Volume Solids | 57.99 | 58.44 | 59.71 | 58.49 | 58.98 |
| NCO:OH | 4.36 | 4.38 | 4.67 | 4.36 | 4.36 |
| PVC | 0 | 1.55 | 3.04 | 1.22 | 2.4 |
| P/B | 0 | 0.07 | 0.15 | 0.05 | 0.1 |
| Wt/Gal | 9.05 | 9.37 | 9.7 | 9.33 | 9.6 |
| Mix Ratio (volume) | 1.89:1 | 1.90:1 | 1.81:1 | 1.92:1 | 1.96:1 |
| Theoretical VOC | 0.14 | 0.14 | 0.13 | 0.14 | 0.13 |

Figure 1B:
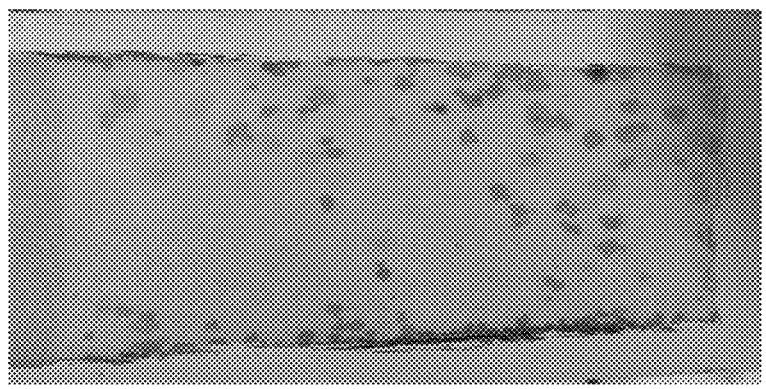
FIG. 1B shows the effect of treatment with the waterborne polyurethane composition according to Ex. 1B containing 7.5% of an inorganic ion-exchanger on a 0.6% (20 mg/m$^2$, 86 ppm) NaCl-contaminated steel panel humidity test for 168 hours.
Figure 1A:
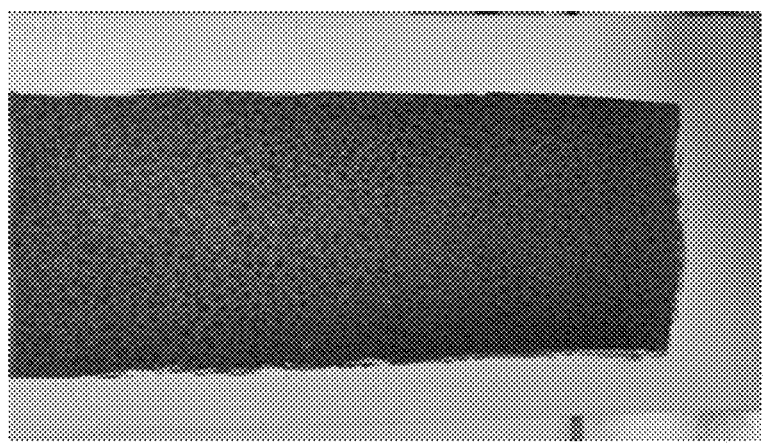
FIG. 1A shows the effect of treatment with the waterborne polyurethane composition according to Ex. 1A which contained no ion-exchanger on a 0.6% (20 mg/m$^2$, 86 ppm) NaCl-contaminated steel panel humidity test for 168 hours.

FIGS. 1A, 1B and 1C each show the effect of treatment with a waterborne polyurethane composition on a 0.6% (20 mg/m$^2$, 86 ppm) NaCl-contaminated steel panel humidity test for 168 hours. In FIG. 1A the waterborne polyurethane composition according to Ex. 1A contained no ion-exchanger. FIG. 1B shows the effect of treatment with the waterborne polyurethane composition according to Ex. 1B containing 7.5% of an inorganic amphoteric ion-exchanger on the NaCl-contaminated panel. FIG. 1C shows the effect of treatment with the waterborne polyurethane composition according to Ex. 10 containing 15% of an inorganic amphoteric ion-exchanger on the NaCl-contaminated panel.

Figure 2A:
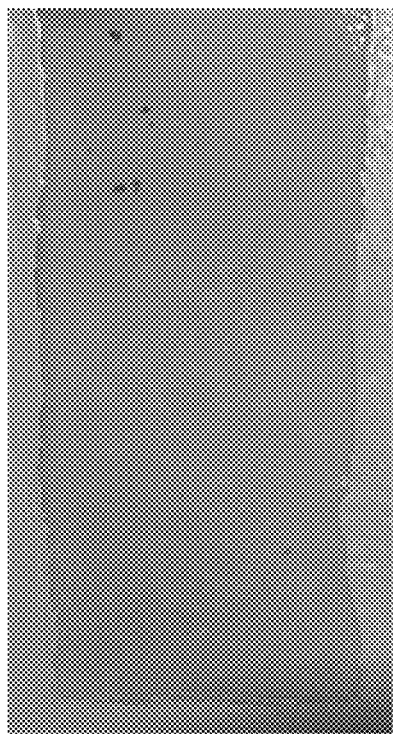
FIG. 2A shows the effect of treatment with the waterborne polyurethane composition according to Ex. 2A containing 7.5% of a mixture (at a 7/3 ratio) of an inorganic anionic ion-exchanger and an inorganic cationic ion-exchanger on a 0.6% (20 mg/m$^2$, 86 ppm) NaCl-contaminated steel panel humidity test for 168 hours.
Figure 2B:
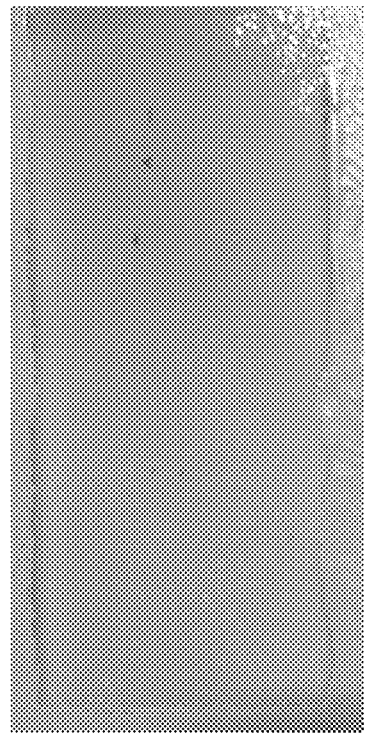
FIG. 2B shows the effect of treatment with the waterborne polyurethane composition according to Ex. 2B containing 15% of a mixture (at a 7/3 ratio) of an inorganic anionic ion-exchanger and an inorganic cationic ion-exchanger on a 0.6% (20 mg/m$^2$, 86 ppm) NaCl-contaminated steel panel humidity test for 168 hours.

FIGS. 2A and 2B each show the effect of treatment with a waterborne polyurethane composition on a 0.6% (20 mg/m$^2$, 86 ppm) NaCl-contaminated steel panel humidity test for 168 hours. FIG. 2A shows the effect of treatment with the waterborne polyurethane composition according to Ex. 2A containing 7.5% of a mixture (at a 7/3 ratio) of an inorganic anionic ion-exchanger and an inorganic cationic ion-exchanger on the NaCl-contaminated. FIG. 2B shows the effect of treatment with the waterborne polyurethane composition according to Ex. 2B containing 15% of a mixture (at a 7/3 ratio) of an inorganic anionic ion-exchanger and an inorganic cationic ion-exchanger on NaCl-contaminated panel.

TABLE II

| Ex. No. | 3A | 3B | 3C |
|---|---|---|---|
| Component 1 | | | |
| DISPERSION A | 124.6 | 66.1 | 66.1 |
| ZNPHOS | 6.9 | 14.4 | |
| ADDITIVE A | 8.7 | 4.6 | 4.6 |

TABLE II-continued

| Ex. No. | 3A | 3B | 3C |
|---|---|---|---|
| Water, DI | 51.6 | 27.3 | 27.3 |
| ADDITIVE D | 1.5 | 0.8 | 0.8 |
| ADDITIVE E | 0.3 | 0.1 | 0.1 |
| ADDITIVE F | 0.3 | 0.1 | 0.1 |

TABLE II-continued

| Ex. No. | 3A | 3B | 3C |
|---|---|---|---|
| ADDITIVE G | 0.3 | 0.1 | 0.1 |
| SOLVENT A | 1.5 | 0.8 | 0.8 |
| Subtotal Component 2 | 188.7 | 107.0 | 114.4 |
| ISOCYANATE B | 111.3 | 59.4 | 63.3 |
| Subtotal | 111.3 | 59.4 | 63.3 |
| Total | 300.0 | 166.4 | 177.7 |
| Theoretical Results | | | |
| Weight Solids | 61.39 | 63.09 | 65.44 |
| Volume Solids | 57.99 | 58.61 | 60.04 |
| NCO:OH | 4.36 | 4.38 | 4.67 |
| PVC | 0 | 2.28 | 4.45 |
| P/B | 0 | 0.07 | 0.15 |
| Wt/Gal | 9.05 | 9.33 | 9.62 |
| Mix Ratio (volume) | 1.89:1 | 1.91:1 | 1.83:1 |
| Theoretical VOC | 0.14 | 0.14 | 0.13 |

Figure 3C:
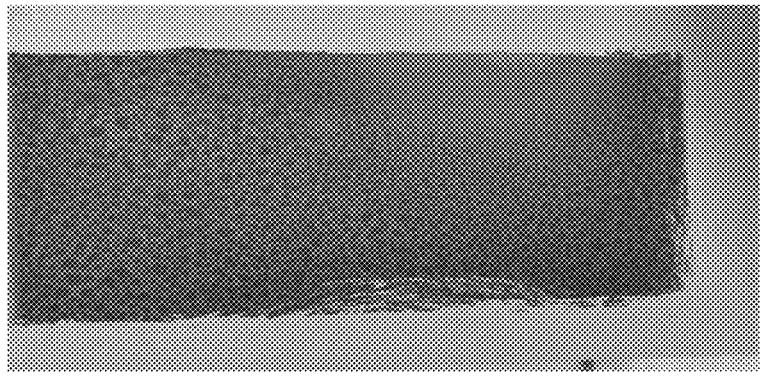
FIG. 3C shows the effect of treatment with the waterborne polyurethane composition according to Ex. 3B containing 15% of zinc phosphate on a 0.6% (20 mg/m$^2$, 86 ppm) NaCl-contaminated steel panel humidity test for 168 hours.
Figure 3B:
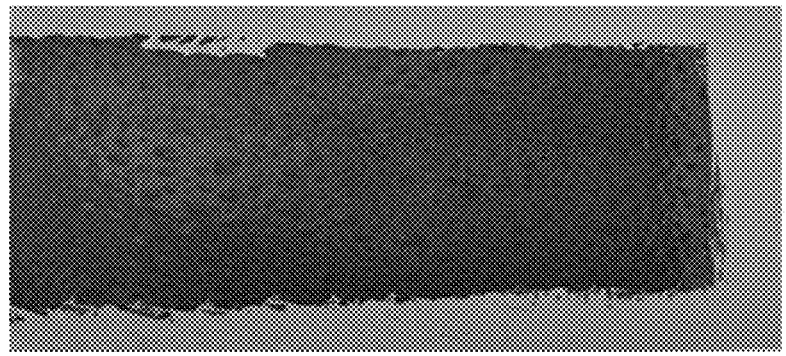
FIG. 3B shows the effect of treatment with the waterborne polyurethane composition according to Ex. 3B containing 7.5% of zinc phosphate on a 0.6% (20 mg/m$^2$, 86 ppm) NaCl-contaminated steel panel humidity test for 168 hours.
Figure 3A:
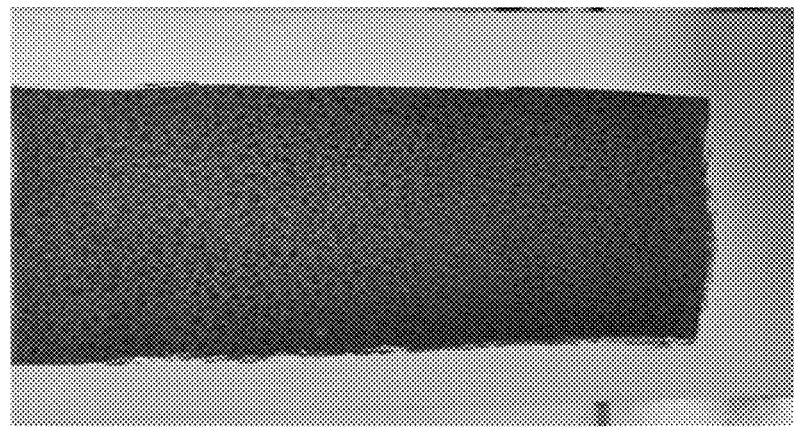
FIG. 3A shows the effect of treatment with the waterborne polyurethane composition according to Ex. 3A which contained no ion-exchanger on a 0.6% (20 mg/m$^2$, 86 ppm) NaCl-contaminated steel panel humidity test for 168 hours.

FIGS. 3A, 3B and 3C each show the effect of treatment with a waterborne polyurethane composition on a 0.6% (20 mg/m$^2$, 86 ppm) NaCl-contaminated steel panel humidity test for 168 hours. In FIG. 3A the waterborne polyurethane composition according to Ex. 3A contained no ion exchange resin. FIG. 3B shows the effect of treatment with the waterborne polyurethane composition according to Ex. 3B containing 7.5% of zinc phosphate on the NaCl-contaminated panel. FIG. 3C shows the effect of treatment with the waterborne polyurethane composition according to Ex. 3C containing 15% of a zinc phosphate on the NaCl-contaminated panel.

As can be appreciated by reference to the above data and the FIGS. 1-4, the present inventors initially found that the addition of ion-exchanger in waterborne two component polyurethane coatings significantly improved rust formation on different levels of salt contaminated steel in the Cleveland condensation test.

Additionally the inventors have found that other coating chemistries such as acrylic, alkyd, polyaspartic, epoxy in also showed improved rust formation by adding ion-exchanger.

Although the present invention has been described in terms of a coating, those skilled in the art will recognize that the principles of the invention may also be applied to adhesives, sealants, castings, paints, and composites as well. The present disclosure is intended to encompass all such materials.

The present invention has been described in terms of the substrate comprising a steel panel. Those skilled in the art will recognize that the principles of the invention may be applied to any substrate capable of corrosion, including but not limited to, stainless steel, cold rolled steel, hot rolled steel, steel coated with zinc metal, zinc compounds, or zinc alloys, such as electrogalvanized steel, hot-dipped galvanized steel, galvanealed steel, and steel plated with zinc alloy. Also, aluminum alloys, aluminum plated steel and aluminum alloy plated steel may be used. Other suitable non-ferrous metals include copper and magnesium, as well as alloys of these materials. The present invention is intended to encompass all such substrates.

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth herein. Such embodiments may be obtained, for example, by combining, modifying, or reorganizing any of the disclosed steps, components, elements, features, aspects, characteristics, limitations, and the like, of the various non-limiting embodiments described in this specification. In this manner, Applicant reserves the right to amend the claims during prosecution to add features as variously described in this specification, and such amendments comply with the requirements of 35 U.S.C. § 112(a), and 35 U.S.C. § 132(a).

Various aspects of the subject matter described herein are set out in the following numbered clauses:

1. An anti-corrosion composition comprising an inorganic ion-exchanger and one selected from the group consisting of a waterborne resin, wherein a substrate exposed to a halide-containing environment and having the anti-corrosion composition applied thereto has a reduced level of corrosion compared to the substrate exposed to the halide-containing environment without the anti-corrosion composition being applied.
2. An anti-corrosion composition comprising an inorganic ion-exchanger and one selected from the group consisting of a resin, wherein a substrate having the anti-corrosion composition applied thereto and exposed to a halide-containing environment has a reduced level of corrosion compared to the substrate exposed to the halide-containing environment without the anti-corrosion composition being applied.
3. The anti-corrosion composition according to one of clauses 1 and 2, wherein the waterborne resin is selected from the group consisting of a waterborne polyurethane, a waterborne polyurea, a waterborne polyurethane-polyurea, a waterborne polyaspartate, a waterborne polyacrylate, a waterborne alkyd, a waterborne siloxane, a waterborne melamine, and a waterborne epoxy.
4. The anti-corrosion composition according to any one of clauses 1 to 3, wherein the organic ion-exchanger is selected from the group consisting of a strong acidic cationic-type ion-exchanger, a weak acidic cationic-type ion-exchanger, a strong basic anionic-type ion-exchanger, a weak basic anionic-type ion-exchanger and combinations thereof.
5. The anti-corrosion composition according to any one of clauses 1 to 4, wherein the waterborne resin comprises a waterborne polyurethane dispersion.
6. The anti-corrosion composition according to any one of clauses 1 to 4, wherein the waterborne resin comprises a waterborne polyurea dispersion.
7. The anti-corrosion composition according to any one of clauses 1 to 4, wherein the waterborne resin comprises a waterborne polyurethane-polyurea dispersion.
8. The anti-corrosion composition according to any one of clauses 1 to 4, wherein the waterborne resin comprises a waterborne polyaspartate dispersion.
9. The anti-corrosion composition according to any one of clauses 1 to 4, wherein the waterborne resin comprises a waterborne polyacrylate dispersion.
10. The anti-corrosion composition according to any one of clauses 1 to 4, wherein the waterborne resin comprises a waterborne alkyd dispersion.
11. The anti-corrosion composition according to any one of clauses 1 to 4, wherein the waterborne resin comprises a waterborne siloxane.

12. The anti-corrosion composition according to any one of clauses 1 to 4, wherein the waterborne resin comprises a waterborne melamine dispersion.
13. The anti-corrosion composition according to any one of clauses 1 to 4, wherein the waterborne resin comprises a waterborne epoxy.
14. The anti-corrosion composition according to any one of clauses 1 to 13, wherein the substrate has a surface halide concentration of greater than 0 mg/m² up to about 90 mg/m² (2.5%, 290 ppm).
15. The anti-corrosion composition according to any one of clauses 1 to 13, wherein the substrate has a surface halide concentration of greater than 0 mg/m² up to about 5 mg/m² (0.15%, 20 ppm).
16. The anti-corrosion composition according to any one of clauses 1 to 13, wherein the substrate has a surface halide concentration of about 5 mg/m² (0.15%, 20 ppm) to about 20 mg/m².
17. The anti-corrosion composition according to any one of clauses 1 to 13, wherein the substrate has a surface halide concentration of about 20 mg/m² to about 90 mg/m² (2.5%, 290 ppm).
18. One of a coating, an adhesive, a sealant, a casting, a surface treatment, a paint and a composite comprising the anti-corrosion composition according to any one of clauses 1 to 17.
19. A paint comprising the anti-corrosion composition according to any one of clauses 1 to 18.
20. A coating comprising the anti-corrosion composition according to any one of clauses 1 to 18.
21. A substrate having applied thereto an anti-corrosion composition comprising an inorganic ion-exchanger and a waterborne resin, wherein the substrate exposed to a halide-containing environment and having the anti-corrosion composition applied thereto has a reduced level of corrosion compared to the substrate exposed to the halide-containing environment without the anti-corrosion composition being applied.
22. A substrate having applied thereto an anti-corrosion composition comprising an inorganic ion-exchanger and a waterborne resin, wherein the substrate having the anti-corrosion composition applied thereto and exposed to a halide-containing environment has a reduced level of corrosion compared to the substrate exposed to the halide-containing environment without the anti-corrosion composition being applied.
23. The substrate according to one of clauses 21 and 22, wherein the waterborne resin is selected from the group consisting of a waterborne polyurethane, a waterborne polyurea, a waterborne polyurethane-polyurea, a waterborne polyaspartate, a waterborne polyacrylate, a waterborne alkyd, a waterborne siloxane, a waterborne melamine, and a waterborne epoxy.
24. The substrate according to any one of clauses 21 to 23, wherein the inorganic ion-exchanger is selected from the group consisting of a strong acidic cationic-type ion-exchanger, a weak acidic cationic-type ion-exchanger, a strong basic anionic-type ion-exchanger, a weak basic anionic-type ion-exchanger and combinations thereof.
25. The substrate according to any one of clauses 21 to 24, wherein the waterborne resin comprises a waterborne polyurethane dispersion.
26. The substrate according to any one of clauses 21 to 24, wherein the waterborne resin comprises a waterborne polyurea dispersion.
27. The substrate according to any one of clauses 21 to 24, wherein the waterborne resin comprises a waterborne polyurethane-polyurea dispersion.
28. The substrate according to any one of clauses 21 to 24, wherein the waterborne resin comprises a waterborne polyaspartate dispersion.
29. The substrate according to any one of clauses 21 to 24, wherein the waterborne resin comprises a waterborne polyacrylate dispersion.
30. The substrate according to any one of clauses 21 to 24, wherein the waterborne resin comprises a waterborne alkyd dispersion.
31. The substrate according to any one of clauses 21 to 24, wherein the waterborne resin comprises a waterborne siloxane dispersion.
32. The substrate according to any one of clauses 21 to 24, wherein the waterborne resin comprises a waterborne melamine dispersion.
33. The substrate according to any one of clauses 21 to 24, wherein the waterborne resin comprises a waterborne epoxy dispersion.
34. The substrate according to any one of clauses 21 to 33, wherein the substrate has a surface halide concentration of greater than 0 mg/m² up to about 90 mg/m² (2.5%, 290 ppm).
35. The substrate according to any one of clauses 21 to 33, wherein the substrate has a surface halide concentration of greater than 0 mg/m² up to about 5 mg/m² (0.15%, 20 ppm).
36. The substrate according to any one of clauses 21 to 33, wherein the substrate has a surface halide concentration of about 5 mg/m² (0.15%, 20 ppm) to about 20 mg/m² (0.6%, 86 ppm).
37. The substrate according to any one of clauses 21 to 33, wherein the substrate has a surface halide concentration of about 20 mg/m² (0.6%, 86 ppm) to about 90 mg/m².
38. The substrate according to any one of clauses 21 to 37 wherein the substrate is selected from the group consisting of metal and concrete.
39. The substrate according to clause 38, wherein the metal is selected from the group consisting of stainless steel, cold rolled steel, hot rolled steel, steel coated with zinc metal, steel coated with zinc compounds, steel coated with zinc alloys, hot-dipped galvanized steel, galvanealed steel, steel plated with zinc alloy, aluminum alloys, aluminum plated steel and aluminum alloy plated steel, copper and magnesium.
40. The substrate according to any one of clauses 21 to 39, wherein the substrate is selected from the group consisting of automotive vehicles, bridges, cranes, superstructures, offshore oil & gas rigs, pipes, tanks, ships, barges, boats, aircraft, concrete, and masonry.
41. A method of imparting corrosion resistance to a substrate comprising exposing the substrate to a halide-containing environment, applying to the substrate an anti-corrosion composition comprising an inorganic ion-exchanger and a waterborne resin, and optionally curing the anti-corrosion composition, wherein the substrate exposed to a halide-containing environment and having the anti-corrosion composition applied thereto has a reduced level of corrosion compared to the substrate exposed to the halide-containing environment without the anti-corrosion composition being applied.
42. A method of imparting corrosion resistance to a substrate comprising applying to the substrate an anti-corrosion composition comprising an inorganic ion-exchanger and a waterborne resin, exposing the substrate to a halide-containing environment, and optionally curing the anti-corrosion composition, wherein the substrate having the anti-corrosion composition applied thereto and exposed to a halide-containing environment has a reduced level of corrosion compared to the substrate exposed to the halide-containing environment without the anti-corrosion composition being applied.

43. The method according to one of clauses 41 and 42, wherein the waterborne resin is selected from the group consisting of a waterborne polyurethane, a waterborne polyurea, a waterborne polyurethane-polyurea, a waterborne polyaspartate, a waterborne polyacrylate, a waterborne alkyd, a waterborne siloxane, a waterborne melamine, and a waterborne epoxy.

44. The method according to any one of clauses 41 to 43, wherein the inorganic ion-exchanger is selected from the group consisting of a strong acidic cationic-type ion-exchanger, a weak acidic cationic-type ion-exchanger, a strong basic anionic-type ion-exchanger, a weak basic anionic-type ion-exchanger and combinations thereof.

45. The method according to any one of clauses 41 to 44, wherein the substrate has a surface halide concentration of greater than 0 mg/m$^2$ up to about 90 mg/m$^2$ (2.5%, 290 ppm).

46. The method according to any one of clauses 41 to 44, wherein the substrate has a surface halide concentration of greater than 0 mg/m$^2$ up to about 5 mg/m$^2$ (0.15%, 20 ppm).

47. The method according to any one of clauses 41 to 44, wherein the substrate has a surface halide concentration of about 5 mg/m$^2$ (0.15%, 20 ppm) to about 20 mg/m$^2$ (0.6%, 86 ppm).

48. The method according to any one of clauses 41 to 44, wherein the substrate has a surface halide concentration of about 20 mg/m$^2$ (0.6%, 86 ppm) to about 90 mg/m$^2$ (2.5%, 290 ppm).

49. The method according to any one of clauses 41 to 44, wherein the substrate is selected from the group consisting of metal and concrete.

50. The method according to clause 49, wherein the metal is selected from the group consisting of stainless steel, cold rolled steel, hot rolled steel, steel coated with zinc metal, steel coated with zinc compounds, steel coated with zinc alloys, hot-dipped galvanized steel, galvanealed steel, steel plated with zinc alloy, aluminum alloys, aluminum plated steel and aluminum alloy plated steel, copper and magnesium.

51. The method according to any one of clauses 41 to 50, wherein the substrate is selected from the group consisting of automotive vehicles, bridges, cranes, superstructures, offshore oil & gas rigs, pipes, tanks, ships, barges, boats, aircraft, concrete, and masonry.

52. The method according to any one of clauses 41 to 51, further including a step of applying a topcoat.

What is claimed is:

1. A substrate having applied thereto an anti-corrosion composition comprising an inorganic ion-exchanger and a waterborne resin, wherein the substrate exposed to a halide-containing environment and having the anti-corrosion composition applied thereto has a reduced level of corrosion compared to the substrate exposed to the halide-containing environment without the anti-corrosion composition being applied, and
   wherein the substrate has been exposed to the halide-containing composition before the anti-corrosion composition has been applied thereto.

2. The substrate according to claim 1, wherein the waterborne resin is selected from the group consisting of a waterborne polyurethane, a waterborne polyurea, a waterborne polyurethane-polyurea, a waterborne polyaspartate, a waterborne polyacrylate, a waterborne alkyd, a waterborne siloxane, a waterborne melamine, and a waterborne epoxy.

3. The substrate according to claim 1, wherein the waterborne resin comprises a dispersion.

4. The substrate according to claim 1, wherein the inorganic ion-exchanger is selected from the group consisting of an acidic cationic-type ion-exchanger, and a basic anionic-type ion-exchanger, and combinations thereof.

5. The substrate according to claim 1, wherein the substrate has a surface halide concentration of greater than 0 mg/m2 up to about 90 mg/m2.

6. The substrate according to claim 1, wherein the substrate has a surface halide concentration of greater than 0 mg/m2 up to about 5 mg/m2.

7. The substrate according to claim 1, wherein the substrate has a surface halide concentration of about 5 mg/m2 to about 20 mg/m2.

8. The substrate according to claim 1, wherein the substrate has a surface halide concentration of about 20 mg/m2 to about 90 mg/m2.

9. The substrate according to claim 1, wherein the substrate is selected from the group consisting of metal and concrete.

10. The substrate according to claim 9, wherein the metal is selected from the group consisting of stainless steel, cold rolled steel, hot rolled steel, steel coated with zinc metal, steel coated with zinc compounds, steel coated with zinc alloys, hot-dipped galvanized steel, galvanealed steel, steel plated with zinc alloy, aluminum alloys, aluminum plated steel and aluminum alloy plated steel, copper and magnesium.

11. The substrate according to claim 1, wherein the substrate is selected from the group consisting of automotive vehicles, bridges, cranes, superstructures, offshore oil & gas rigs, pipes, tanks, ships, barges, boats, aircraft, concrete, and masonry.

12. A method of imparting corrosion resistance to a substrate comprising:
   exposing the substrate to a halide-containing environment;
   applying to the substrate an anti-corrosion composition comprising an inorganic ion-exchanger and a waterborne resin, and
   optionally curing the anti-corrosion composition,
   wherein the substrate exposed to a halide-containing environment and having the anti-corrosion composition applied thereto has a reduced level of corrosion compared to the substrate exposed to the halide-containing environment without the anti-corrosion composition being applied.

13. The method according to claim 12, wherein the waterborne resin is selected from the group consisting of a waterborne polyurethane, a waterborne polyurea, a waterborne polyurethane-polyurea, a waterborne polyaspartate, a waterborne polyacrylate, a waterborne alkyd, a waterborne siloxane, a waterborne melamine, and a waterborne epoxy.

14. The method according to claim 12, wherein the waterborne resin comprises a dispersion.

15. The method according to claim 12, wherein the inorganic ion-exchanger is selected from the group consisting of an acidic cationic-type ion-exchanger, and a basic anionic-type ion-exchanger, and combinations thereof.

16. The method according to claim 12, wherein the substrate has a surface halide concentration of greater than 0 mg/m2 up to about 90 mg/m2.

17. The method according to claim 12, wherein the substrate has a surface halide concentration of greater than 0 mg/m2 up to about 5 mg/m2.

18. The method according to claim 12, wherein the substrate has a surface halide concentration of about 5 mg/m2 to about 20 mg/m2.

19. The method according to claim 12, wherein the substrate has a surface halide concentration of about 20 mg/m2 to about 90 mg/m2.

20. The method according to claim 12, wherein the substrate is selected from the group consisting of metal and concrete.

21. The method according to claim 20, wherein the metal is selected from the group consisting of stainless steel, cold rolled steel, hot rolled steel, steel coated with zinc metal, steel coated with zinc compounds, steel coated with zinc alloys, hot-dipped galvanized steel, galvanealed steel, steel plated with zinc alloy, aluminum alloys, aluminum plated steel and aluminum alloy plated steel, copper and magnesium.

22. The method according to claim 12, wherein the substrate is selected from the group consisting of automotive vehicles, bridges, cranes, superstructures, offshore oil & gas rigs, pipes, tanks, ships, barges, boats, aircraft, concrete, and masonry.

23. The method according to claim 12, further including a step of applying a topcoat.

* * * * *